United States Patent
Crespo

(10) Patent No.: US 8,176,872 B2
(45) Date of Patent: May 15, 2012

(54) TUBULAR ELEMENT AND A METHOD FOR MANUFACTURING THEREOF

(75) Inventor: Eric Crespo, Binic (FR)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 12/681,938

(22) PCT Filed: Oct. 7, 2008

(86) PCT No.: PCT/SE2008/051137
§ 371 (c)(1),
(2), (4) Date: Jun. 21, 2010

(87) PCT Pub. No.: WO2009/048417
PCT Pub. Date: Apr. 16, 2009

(65) Prior Publication Data
US 2010/0275850 A1    Nov. 4, 2010

(30) Foreign Application Priority Data
Oct. 8, 2007    (SE) ...................... 0702249

(51) Int. Cl.
*A01J 5/04* (2006.01)
(52) U.S. Cl. ................ 119/14.36; 119/14.44; 119/14.51
(58) Field of Classification Search ............... 119/14.51, 119/14.02, 14.05, 14.07, 14.29, 14.3, 14.36, 119/14.41, 14.42, 14.44, 14.47, 14.53; 285/179, 285/179.1; 138/177, 178, 42, 44, 92
See application file for complete search history.

(56) References Cited

U.S. PATENT DOCUMENTS

| | | | |
|---|---|---|---|
| 3,476,085 A | 11/1969 | Noorlander | |
| 3,611,993 A | 10/1971 | Norton | |
| 3,659,558 A | 5/1972 | Noorlander | |
| 3,967,587 A | 7/1976 | Noorlander | |
| 4,604,969 A | 8/1986 | Larson | |
| 6,055,931 A | 5/2000 | Sanford, Jr. | |
| 6,308,655 B1 | 10/2001 | Oosterling | |
| 6,439,157 B1 * | 8/2002 | Petterson | 119/14.47 |
| 2006/0005772 A1 * | 1/2006 | Shin | 119/14.52 |

FOREIGN PATENT DOCUMENTS

| | | |
|---|---|---|
| WO | 99/31968 | 7/1999 |
| WO | 01/33947 | 5/2001 |
| WO | 2005/120217 | 12/2005 |

OTHER PUBLICATIONS

Examination Report, dated Jun. 30, 2011, in Application No. 584583.
International Search Report dated Jan. 4, 2009, from corresponding PCT application.

* cited by examiner

*Primary Examiner* — Rob Swiatek
*Assistant Examiner* — Lisa Tsang
(74) *Attorney, Agent, or Firm* — Young & Thompson

(57) ABSTRACT

A tubular element (9) tubular element (9) provides an inner space forming a passage for conducting milk, with a first material portion (9a) which constitutes the main part of the tubular element (9) and an additional material portion (9b) which includes a vent passage (9b) adapted to supply air to the inner space of the tubular element (9). The first material portion (9a) and the additional material portion (9b) are fixedly connected to each other in a contact area (9d) such that the material portions (9a, b) form an integrated unit. A method of manufacturing the tubular element.

19 Claims, 2 Drawing Sheets

TUBULAR ELEMENT AND A METHOD FOR MANUFACTURING THEREOF

BACKGROUND OF THE INVENTION AND PRIOR ART

The present invention relates to a tubular element and a method for manufacturing thereof. The tubular element has an inner space forming a passage for conducting milk, wherein the tubular element constitutes a first material portion which contains the main part of the tubular element and an additional material portion which includes a vent passage adapted to supply air to the inner space of the tubular element and wherein the first material portion and the additional material portion are arranged in contact with each other in a contact area.

A cluster for milking of animals comprises several teat cups and a corresponding number of short milk tubes each connected to a teat cup. Each teat cup includes a liner and a rigid shell forming a pulsation chamber. The liner and the short milk tube define a milk passage for conducting milk from a teat to a claw of the cluster. During a milking process, a substantially constant vacuum is applied to the milk passage at the same time as a pulsating vacuum is transferred to the pulsation chamber. During periods when vacuum is transferred to the pulsation chamber, the liner expands and causes a pressure drop in the upper part of the milk passage. If at the same time an abundant flow of milk is present in the milk passage, there is risk that milk will be sucked backwards in the milk passage to the teat. Such a backflow of milk is undesired by several reasons.

U.S. Pat. No. 6,055,931 shows an air vent plug adapted to be inserted through a hole in a wall of a milk tube. The air vent plug has an outer flange engaging an outer surface of the milk tube, a barrel extending through the wall of the milk tube, a tip portion engaging an inner surface of the milk tube and a vent passage extending through the vent plug. The vent passage is dimensioned to allow supply of air into the milk passage of the milk tube. The existence of the vent plug eliminates the risk of back flow of milk in the milk passage. However, the outer flange of the vent plug projects out from the outer surface of the milk tube and the tip portion projects into the milk passage. This parts of the vent plug provides spaces and corners in the vicinity of the vent passage in which dirt and milk residues can be caught. It is a risk that colonies of bacteria can be grown in such spaces and corners.

SUMMARY OF THE INVENTION

The object of the present invention is to provide a tubular element for conducting milk having a construction such that back flow of milk in the tubular element is prevented and at the same time as the tubular element is very hygienic to use.

This object is obtained, according to the invention, by the feature that the first material portion and the additional material portion are fixedly connected to each other in the contact area such that the material portions form an integrated unit. Since the tubular element is provided with a vent passage, the problem with backflow is eliminated. By forming the additional material portion and the vent passage as an integrated part of the first material portion, it is not possible to release the additional material portion and the vent passage from the first material portion without destroying the tubular element. Consequently, the tubular element is sold and mounted as a one-piece unit. Since the material parts of the tubular element are fixedly connected, no further parts need to be used for holding the material portions in a connected state. Thus, the additional material portion can be given a simple design. Preferably, the material portions are fixedly connected to each other in the whole contact area by means of a homogeneous connection. In this case, the contact area can provide a tight sealing between the material portions which is completely free from irregularities and concavities. Thus, it does not exist any spaces in the contact area in which dirt, particles and bacteria can be caught. Consequently, the tubular element is very hygienic.

According to a preferred embodiment of the invention, the first material portion and the additional material portion are moulded together in the contact area. Thereby, it is possible to achieve a strength and airtight connection between the material portions in the contact area with a high quality. Preferably, the material parts are moulded together by a moulding process called co-moulding. In a co-moulding process, the material portions are injected in sequence which makes it possible to mould one material portion on a previously moulded material portion. Alternatively, the material portions may be fixedly attached to each other by means of an adhesive such as a suitable glue.

According to a further embodiment of the invention, an outer surface of the tubular element, which is adapted to be in contact with a surrounding, is formed by an outer surface of the first material portion and an outer surface of the additional material portion, wherein the outer surfaces are arranged in relation to each other such that they form a smooth transition between each other at an outer part of the contact area. In this case, the outer surface of the tubular element does not have any spaces or corners in this area in which dirt and particles can be caught. Advantageously, the inner space of the tubular element is defined by an inner surface of the first material portion and an inner surface of the additional material portion, wherein the inner surfaces are arranged in relation to each other such that they form a smooth transition between each other at an inner part of the contact area. Consequently, the inner surface of the tubular element does not either have any spaces or corners in which milk residues can be caught.

According to a further embodiment of the invention, the first material portion and the additional material portion is made of different materials. A co-moulding process makes it possible to produce a one-piece tubular element of different materials. The additional material portion may be a relatively stiff plastic material. Thereby, the shape of the vent passage in the additional material portion will be maintained even if the tubular element is subjected to bending forces. The material in the first material portion may be a material normally used in short milk tubes and liners. Such a material may be a rubber material, a PVC material, a TPE material or a silicone material.

According to a further embodiment of the invention, the tubular element may have at least one curved section. The tubular element may be manufactured of a material having a stiffness such that the tubular element has a predetermined shape in an unloaded state. Such a tubular element can be provided with a curved section. The inner space of the tubular element may have a larger cross section area in the curved section than in an adjacent section. With such a design of the curved section, the flow resistance in the curved section is reduced which facilitates the milk flow through the tubular element. The additional material portion may be positioned such that the vent passage is located upstream the curved section with respect to the intended flow direction of the milk through the tubular element. The milk flow in a tubular element will many times be retarded in a curved section. It is therefore a risk that the whole cross section area of the milk passage will be filled with milk in the lower curved section.

Therefore, it is preferable to arrange the vent passage upstream the curved section. Alternatively, the additional material portion is positioned such that the vent passage is located in the curved section of the tubular element. In such a position, the vent passage is relatively protected from dirt which can whirl up from a floor in a milking stall. However, it is also possible to position the additional material portion such that the vent passage is located downstream the curved section with respect to the intended flow direction of the milk through the tubular element.

According to a further embodiment of the invention, the tubular element is adapted to be oriented in a working position in which the milk passage has a larger vertical inclination upstream the curved section than downstream the curved suction with respect to the intended flow direction of the milk through the tubular element. In such a working position, there is a risk that the milk passage downstream the curved section will be filled with milk when the milk flow is abundant. The additional material portion may here be positioned such that the vent passage is located in a radial inner part of the curved section. The radial inner part of the curved section is here located at a higher level than a corresponding portion of the radial outer part the curved section. Due to the gravity, the milk will mainly flow along the radial outer part of the curved section. In the most cases, a vent passage located in the radial inner part of the curved section only temporary will come in contact with the milk in the milk passage.

According to a further embodiment of the invention, the vent passage has a conical shape. Preferably, the conical vent passage has an inner opening to the inner space and an outer opening to a surrounding, wherein the inner opening has a larger cross section area than the outer opening. The conical surface of the vent passage makes that milk, which has penetrated into the vent passage, will be quickly guided back to the milk passage. Since the inlet opening of the conical vent passage has the smallest cross section area, it is only possible for particles having a smaller cross section area than the inlet opening to follow the air into the vent passage. Furthermore, the expansion of the vent passage in the flow direction of the air eliminates the risk that the vent passage is blocked by particles.

According to a further embodiment of the invention, the tubular element includes a short milk tube used in a cluster for conducting milk from a teat cup. Usually, the short milk tube is connected to a liner of a teat cup. The problem with back flow of milk in the short milk tube and the liner is eliminated by the use of a tubular element according to the invention. The tubular element may also include the liner of the teat cup. In this case, the tubular element consist both the short milk tube and the liner in a milking cluster.

The above-mentioned object is also achieved in a method characterised by the step of connecting the first material portion and the additional material portion fixedly to each other in the contact area such that the material portions form an integrated unit. In such a manner, a tubular element is provided with a vent passage which eliminates the problem with backflow in the tubular element. Furthermore, the contact area between the integrated material portions forms a homogenously connection without irregularities and spaces in which dirt and bacteria can be caught. Consequently, such a manufactured tubular element is very hygienic. Preferably, the method comprises the step of connecting the first material portion and the additional material portion by means of moulding process. Advantageously, such a moulding process is a co-moulding process. The co-moulding process may comprise the steps of injecting the material of the additional material portion into a mould form such that the additional material portion with the vent passage is formed and injecting the material of the first material portion into the mould form and on the initially formed additional material portion such that the material portions are moulded together in the contact area. Alternatively, the co-moulding process may comprise the steps of injecting the material of the additional material portion into a first mould form such that the additional material portion with the vent passage is manufactured, placing the moulded additional portion in a second mould form and injecting the material of the first material portion into the second mould form and on the initially manufactured additional material portion such that the material portions are moulded together in the contact area. According to a further alternatively, the co-moulding process may comprise the steps of injecting the material of the first material portion into a mould form such that the first material portion is manufactured and injecting the material of the additional material portion into the mould form and on the initially manufactured first material portion such that the material portions are moulded together in the contact area. Consequently, the tubular element can be manufactured in different ways.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
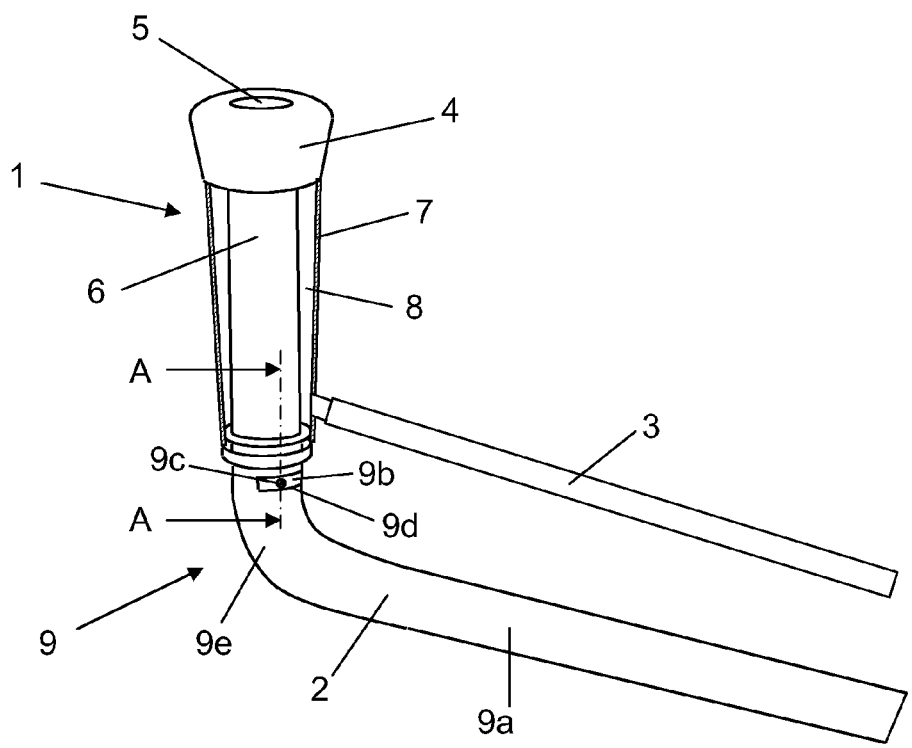
FIG. 1 shows a part of a cluster comprising a tubular element according to the invention.

FIG. 1 shows one teat cup 1 of a milking cluster. A complete milking cluster comprises usually two or four such teat cups 1. A short milk tube 2 is connected to the teat cup 1. The short milk tube is adapted to transport milk from the teat cup 1 to a not shown claw of the milking cluster. A pulse tube 3 is connected to the teat cup 1. The pulse tube 3 is adapted to transfer a pulsating pressure to the teat cup 1. The teat cup 1 comprises a mouthpiece 4 having an opening 5 to an inner space for receiving a teat of an animal during a milking process. The inner space of the teat cup 1 is defined by an inner surface of a flexible liner 6. The inner spaces of the liner 6 and an inner surface of short milk tube 2 form a milk passage for conducting milk from a teat of an animal to the claw during a milking process. The teat cup 1 comprises a rigid shell 7 enclosing the liner 6 in a manner such a pulsation chamber 8 is formed between the flexible liner 6 and the rigid shell 7. The short milk tube 2 and the liner 6 are here parts of a tubular element 9 formed in one-piece. In this case, the one-piece tubular element 9 also comprises the mouthpiece 4 of the teat cup 1.

During a milking process, a substantially constant vacuum is applied to the milk passage of the tubular element 9. At the same time, a pulsating vacuum is transferred to the pulsation chamber 8 of the teat cup 1 by means of the pulse tube 3. During periods when the pressure in the pulsation chamber 8 decreases, the liner 6 expands. The expanding motion of the liner 6 causes a pressure drop in the inner space of the liner 6. If at the same time an abundant flow of milk is present in the milk passage, there is a risk that the milk in the passage will be sucked backwards to the teat. In order to eliminate this risk, the short milk tube 2 has been provided with an additional material portion 9b including a vent passage 9c. The vent passage 9c comprises a through hole dimensioned to allow supply of air from the surrounding to the inner space of the tubular element 9 in a desired quantity. Thereby, the decreasing pressure in the inner space of the liner 6 is prevented to drop to a level at which the milk risks to be sucked backwards in the milk passage. The additional material portion 9b has here a substantially rectangular shape but of course it can have an arbitrary shape. The main part of the one-piece tubular element 9 constitutes of a first material portion 9a. The material in the first material portion 9a could be any suitable material normally used for short milk tubes and liners, for instance, a rubber material, a PVC material, a TPE material or a silicone material. Preferably, the additional material portion 9b is made of another material than the material in the first material portion 9a. The additional material portion 9b can be made of a plastic material having stiffer properties than the material in the first material portion 9a. However, it is not excluded to use the same kind of material in the additional material portion 9b as in the first material portion 9a. The tubular element 9 in FIG. 1 has a curved portion 9e.

Figure 2:
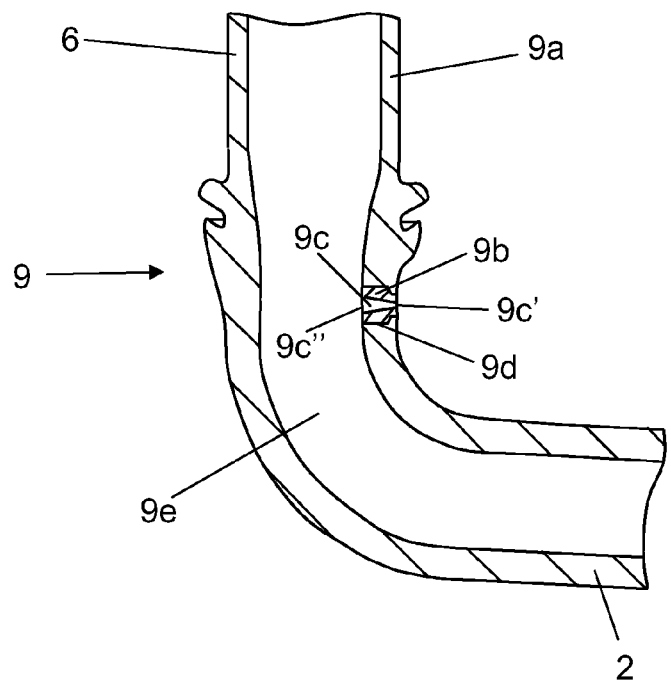
FIG. 2 shows a cross section view along plane A-A of the tubular element in FIG. 1

FIG. 2 shows a cross section view of the curved portion 9e of the tubular element 9 in FIG. 1. It is here visible that the first material portion 9a and the additional material portion 9b are fixedly connected to each other in a contact area 9d such that the material portions 9a, b form an integrated unit. Preferably, the first material portion 9a and the additional material portion 9b are moulded together in the contact area 9d. The tubular element 9 has an outer surface adapted to be in contact with a surrounding. The outer surface of the tubular element 9, which is adapted to be in contact with a surrounding, is formed by an outer surface of the first material portion and an outer surface of the additional material portion. The outer surfaces $9a_1$, $9b_1$ are arranged in relation to each other such that they form a smooth transition between each other at an outer part $9d_1$ of the contact area. With such an even outer surface, the risk that dirt and bacteria are caught on the outer surface in the vicinity of the vent passage 9c is relatively small. The inner space of the tubular element is defined by an inner surface $9a_2$ of the first material portion and an inner surface $9b_2$ of the additional material portion 9b. The inner surfaces $9a_2$, $9b_2$ are arranged in relation to each other such that they form a smooth transition between each other at an inner part $9d_2$ of the contact area. Consequently, the tubular element 9 has an even inner surface also in this area of the milk passage. Thus, the risk is minimal that milk residues are collected on the inner surface of the tubular element 9 in the vicinity of the vent passage 9c.

In a working position, the tubular element 9 is oriented such that the milk passage has a larger vertical inclination upstream the curved section 9e than downstream the curved section 9e with respect to the intended flow direction of the milk in the passage. The liner 6 forms mainly the vertical part of the milk passage upstream the curved portion 9e. The short milk tube 2 forms a relatively small part of the vertical part of the milk passage, the curved section 9e and a nearly horizontal part of the milk passage downstream the curved section 9e. The additional material portion 9b is, in FIG. 2, positioned such that the vent passage 9c is located immediately upstream the curved section 9e with respect to the intended flow direction of the milk in the tubular element 9. The vent passage 9c secures the supply of air to the inner space of the liner 6 during the expansion of the liner 6. The existence of the vent passage 9c eliminates the risk of a backflow of milk in the milk passage. The vent passage 9c is here arranged above a radial inner part of the curved section 9e. In this position, the vent passage 9c is relatively protected from dirt and particles, which can whirl up from a floor of a milking stall. The vent passage 9c has a conical shape. The conical vent passage 9c has an inner opening $9c_2$ to the inner space and an outer opening $9c_1$ to the surrounding. The inner opening $9c_2$ has a larger cross section area than the outer opening $9c_1$. The shape of the vent passage 9c makes that milk in the milk passage, which has penetrated into the vent passage 9c, quickly flows back to the milk passage due to the conical surface of the vent passage 9c and the airflow. Furthermore, only particles having a smaller size than the inlet opening $9c_1$ can penetrate into the vent passage 9c. Since the vent passage 9c has a conical shape, it expands in the flow direction of the air. Consequently, there is no risk that the particles block the vent passage 9c.

Figure 3:
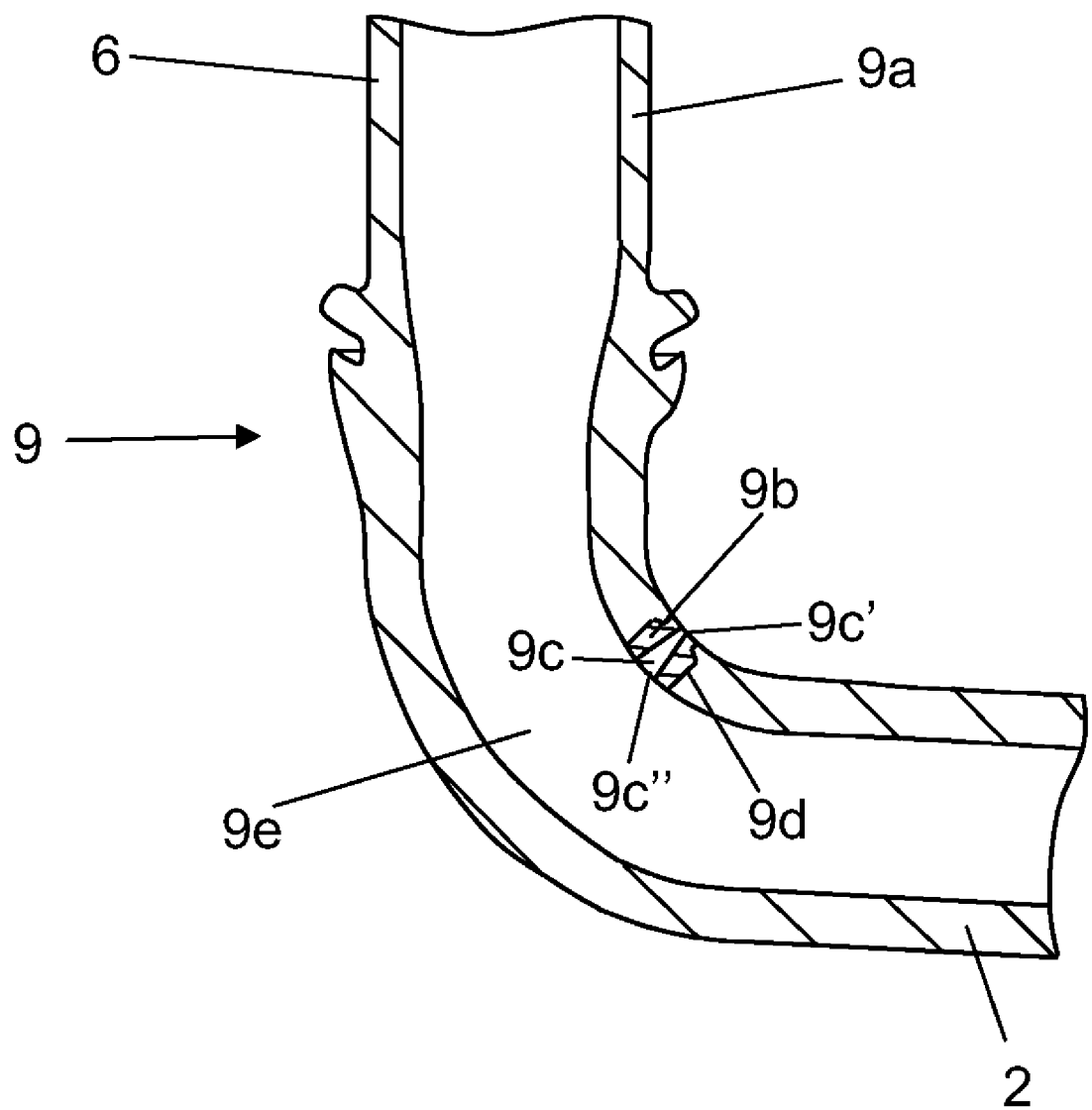
FIG. 3 shows a cross section view of a tubular element according to a second embodiment of the invention.

FIG. 3 shows an alternative positioning of the material portion 9b. In this case, the vent passage 9c is located in the curved section 9e. The vent passage 9c is arranged in a radial inner part of the curved section 9e. Due to the gravity, the main part of the milk flows in a radial outer part of the curved section 9e. Therefore, the milk in the passage rarely comes in contact with the vent passage 9c. Furthermore, the partially downwardly directed opening $9c_2$ prevents milk from penetrating into the vent passage 9c. The milk passage of the curved section 9e has here been provided with a larger cross section area than adjacent sections of the milk passage. Thereby, the flow resistance in the curved section 9e is reduced which facilitates the milk flow through the tubular element 9. Furthermore, the risk that milk fills up the whole cross section area in the curved section 9c is reduced.

Preferably, the one-piece tubular element 9 is manufactured by means of a co-moulding process. It is easy to manufacture a tubular element 9 by two integrated material portions of different materials by such a moulding process. Advantageously, the additional material portion 9b is manufactured of a relatively stiff plastic material. Thereby, the vent passage 9c maintains its shape even if the tubular element 9 will be elastically deformed. The first material portion 9a can, for example, be manufactured of a silicon material. A co-moulding process is performed by means of a mould form defining the surfaces of the tubular element 9. Initially, the material of the additional material portion is injected into the mould form such that the additional material portion with the vent passage 9c is formed. Thereafter, the material of the first material portion 9a is injected into the mould form and on the initially formed additional material portion 9b. The first material portion 9a is here moulded together with the additional material portion 9b in the contact area 9d. The final moulded tubular element 9 constitutes a one-piece element. Alternatively, the material of the additional material portion 9b is injected into a first mould form such that the additional material portion 9b with the vent passage 9c is manufactured. The manufactured additional portion 9b is placed in a second mould form and the material of the first material portion 9a is injected into the second mould form and on the initially manufactured additional material portion 9b such that the material portions 9a, b are moulded together in the contact area 9d. According to a further alternative, the material of the first material portion 9a is injected into a mould form such that the first material portion 9a is manufactured. Thereafter, the material of the additional material portion 9b is injected into the mould form and on the initially manufactured first material portion 9a such that the material portions 9a, b are moulded together in the contact area 9d.

The invention is not limited to the described embodiments but may be varied and modified freely within the scope of the claims. The tubular element does not need to include a short milk tube and a liner. The tubular element can only include a short milk tube or a milk tube of an arbitrary kind. The tubular element does not need to have a curved section. The tubular element can be straight. The tubular element can have a cross section area of an arbitrary shape.

The invention claimed is:

1. A tubular element for conducting milk, comprising:
a first straight portion (9a) of a first material, the first straight portion having a terminal end suitable for connection with a teat cup and, in use, having a generally vertical orientation;
a second straight portion (9a) for connection with a milking cluster and, in use, having a generally horizontal orientation, the second straight portion being of the first material;
a curved portion (9e) connecting the first and second straight portions, the curved portion being of the first material,
the first straight portion, the curved portion and the second straight portion together having an inner space forming a milk passage for conducting milk, during a milking operation, from a connected teat cup to the milking cluster; and
an opening penetrating through a wall of one of the first straight portion, the curved portion and the second straight portion, the wall opening defining a contact area (9d);
an additional material portion (9b) comprising a vent passage (9c) defining a through hole of the wall supplying surrounding air to the inner space, the additional material portion fixedly connected to the contact area such that the additional material portion and the wall opening form an integrated unit with the additional material portion (9b) fixedly connected to the wall opening defining the contact area (9d), the through hole dimensioned to allow the surrounding air into the inner space in a quantity sufficient, during use of the teat cup in the milking operation, to prevent a decreased pressure in the inner space to a pressure level where conducted milk is sucked backwards in the milk passage, thereby preventing a backflow of the conducted milk in the inner space,
wherein outer and inner surfaces of the additional material portion are co-planar with corresponding adjacent outer and inner surfaces of the wall opening.

2. The tubular element of claim 1, wherein,
a thickness of the additional material portion varies from the inner surface to the outer surface of the through hole,
the additional material portion comprises a shoulder,
the wall opening comprises a shoulder, and
the shoulder of the additional material portion contacts the shoulder of the wall opening.

3. The tubular element of claim 1, wherein the additional material portion is a material different than the first material defining the wall opening, the material of the additional material portion being stiffer than the first material defining the wall opening, the shape of the vent passage in the additional material portion being maintained when subjecting the tubular element to bending forces at an area of the wall opening.

4. The tubular element of claim 1, wherein a cross section of the inner space of the curved portion is larger than a cross section of the inner space of the first straight portion and larger than a cross section of the inner space of the second straight portion.

5. The tubular element of claim 1, wherein the vent passage (9c) is located upstream of the curved portion (9e) with respect to the intended flow direction of the milk through the tubular element (9), and the shape of the vent passage in the additional material portion being maintained when subjecting the tubular element to bending forces at an area of the wall opening.

6. The tubular element of claim 1, wherein the vent passage (9c) has an inner opening (9c") and outer opening (9c'), the inner opening (9c") having a larger cross section area than the outer opening (9c').

7. The tubular element of claim 1,
further comprising a teat cup (1) connected to the terminal end of the first straight portion, the teat cup comprising i) a rigid shell (7), ii) a pulse tube connection in the rigid shell, the pulse tube connection for connection to a pulse tube (3) adapted to transfer a pulsating pressure to the teat cup, iii) an inner space for receiving a teat of an animal during a milking process, the inner space of the teat cup (1) defined by an inner surface of a flexible liner (6) defined by the first straight portion (9a), the rigid shell (7) enclosing the flexible liner (6) to define a pulsation chamber (8) formed between the flexible liner (6) and the rigid shell (7), the vent passage being external to the teat cup, wherein the vent passage (9c) secures a supply of the surrounding air to the inner space of the liner (6) during the expansion of the liner (6), the vent passage (9c) thus eliminating the backflow of the conducted milk.

8. A tubular element for conducting milk, comprising:
a first straight portion (9a) of a first material, the first straight portion having a terminal end suitable for connection with a teat cup and, in use, having a generally vertical orientation;
a second straight portion (9a) for connection with a milking cluster and, in use, having a generally horizontal orientation, the second straight portion being of the first material;
a curved portion (9e) connecting the first and second straight portions, the curved portion being of the first material,
the first straight portion, the curved portion and the second straight portion together having an inner space forming a milk passage for conducting milk, during a milking operation, from a connected teat cup to the milking cluster; and
an opening penetrating through a wall of one of the first straight portion, the curved portion and the second straight portion, the wall opening defining a contact area (9d);
an additional material portion (9b) comprising a vent passage (9c) defining a through hole of the wall supplying surrounding air to the inner space, the additional material portion fixedly connected to the contact area such that the additional material portion and the wall opening form an integrated unit with the additional material portion (9b) fixedly connected to the wall opening defining the contact area (9d), the through hole dimensioned to allow the surrounding air into the inner space in a quantity sufficient, during use of the teat cup in the milking operation, to prevent a decreased pressure in the inner space to a pressure level where conducted milk is sucked backwards in the milk passage, thereby preventing a backflow of the conducted milk in the inner space,
wherein the vent passage (9c) is located in the curved portion (9e), and outer and inner surfaces of the additional material portion are co-planar with corresponding adjacent outer and inner surfaces of the wall opening.

9. The tubular element of claim 8, wherein,
the vent passage (9c) is located in an inside curved part of the curved portion, and the vent passage is partially downwardly directed to prevent milk from penetrating into the vent passage.

10. The tubular element of claim 9, wherein the vent passage (9c) has an overall conical shape decreasing from the inside surface toward the outside surface of the vent passage.

11. A tubular element for conducting milk, comprising:
a first straight portion (9a) with a terminal end suitable for connection with a teat cup and, in use, having a generally vertical orientation;
a second straight portion (9a) for connection with a milking cluster and, in use, having a generally horizontal orientation;
a curved portion (9e) connecting the first and second straight portions,
the first straight portion, the curved portion and the second straight portion together having an inner space forming a passage for conducting milk;
a vent passage (9c) comprising a hole penetrating through a wall of the curved portion, the curved portion being of a first material, the vent passage supplying outside air to the inner space of the curved portion; and
an additional material portion (9b) fixedly connected to the wall passage (9c), the additional material portion and the wall passage forming an integrated unit having co-planar adjacent inside and outside surfaces.

12. The tubular element of claim 11, wherein,
an outer wall surface of the vent passage and an outer wall surface of the curved portion adjoining the outer wall surface of the vent passage form a smooth transition between each other, and
the additional material portion (9b) is located at an internal surface of the hole comprised by the vent passage (9c), the additional material portion defining an always-open through hole supplying the outside air to the inner space of the curved portion, the through hole dimensioned to allow the outside air into the inner space in a quantity sufficient, during use of the teat cup in the milking operation, to prevent a decrease pressure in the inner space to a pressure level where conducted milk is sucked backwards in the milk passage thereby preventing a backflow of the conducted milk.

13. The tubular element of claim 11, wherein the vent passage presents an elongated rectangular exterior opening.

14. The tubular element of claim 11, wherein the vent passage is located in an inside curved part of the curved portion.

15. A method for manufacturing a tubular element, comprising the steps of:
forming an integrated unit by connecting an additional material portion (9b) to a wall opening (9c) of a first material portion (9a),
the first material portion (9a) comprising
a first straight portion (9a) with a terminal end suitable for connection with a teat cup and, in use, having a generally vertical orientation;
a second straight portion (9a) for connection with a milking cluster and, in use, having a generally horizontal orientation;
a curved portion (9e) connecting the first and second straight portions,
the first straight portion, the curved portion and the second straight portion together having an inner space forming a passage for conducting milk,
the wall opening penetrating through a wall of one of the first straight portion, the curved portion and the second straight portion, the wall opening defining a contact area (9d),
the additional material portion (9b) comprising an always-open vent passage (9c) defining a through hole of the wall supplying surrounding air to the inner space, the additional material portion fixedly connected to the contact area such that the additional material portion and the opening form an integrated unit,
the through hole having a decreasing opening area from the inner surface to the outer surface of the through hole, the opening area of the through hole at the inner surface being greater than the opening area of the through hole at the outer surface; and
attaching a teat cup to the first straight portion,
wherein outer and inner surfaces of the additional material portion are co-planar with corresponding adjacent outer and inner surfaces of the wall opening.

16. A method according to claim 15, wherein the step of connecting the additional material portion (9b) to the wall opening (9c) is accomplished by a molding process.

17. A method according to claim 16, wherein said molding process comprises the further steps of:
injecting material of the additional material portion (9b) into a mold form such that the additional material portion (9b) with the vent passage (9c) is manufactured, the curved portion (9e) connecting the first and second straight portions being molded as a curved part; and
injecting material of the first material portion (9a) into the mold form and on the initially manufactured additional material portion (9b) such that the first and additional material portions (9a, b) are together in the contact area (9d).

18. A method according to claim 16, comprising the further steps of:
injecting material of the additional material portion (9b) into a first mold form such that the additional material portion (9b) with the vent passage (9c) is manufactured, the curved portion (9e) connecting the first and second straight portions being molded as a curved part,
placing the molded additional portion (9b) in a second mold form and injecting material of the first material portion (9a) into the second mold form and on the initially manufactured additional material portion (9b) such that the material portions (9a, b) are molded together in the contact area (9d), the additional material portion (9b) defining an always-open vent passage.

19. A method according to claim 16, comprising the further steps of:
injecting material of the first material portion (9a) into a mold form such that the first material portion (9a) is manufactured, the curved portion (9e) connecting the first and second straight portions being molded as a curved part; and
injecting material of the additional material portion (9b) into the mold form and on the initially manufactured first material portion (9a) such that the material portions (9a, b) are molded together in the contact area (9d),
wherein the material of the first material portion is different from the material of the additional material portion, the material of the additional material portion having stiffer properties than the material of the first material portion.

* * * * *